(12) United States Patent
Wenning et al.

(10) Patent No.: US 6,861,465 B2
(45) Date of Patent: Mar. 1, 2005

(54) RADIATION CURABLE POWDER COATING COMPOSITIONS AND THEIR USE

(75) Inventors: Andreas Wenning, Nottuln (DE); Giselher Franzmann, Witten (DE); Emmanouil Spyrou, Marl (DE)

(73) Assignee: Degussa AG, Duesseldorf (DE)

( * ) Notice: Subject to any disclaimer, the term of this patent is extended or adjusted under 35 U.S.C. 154(b) by 204 days.

(21) Appl. No.: 10/322,666

(22) Filed: Dec. 19, 2002

(65) Prior Publication Data

US 2003/0125456 A1 Jul. 3, 2003

(30) Foreign Application Priority Data

Dec. 22, 2001 (DE) .......................... 101 63 826

(51) Int. Cl.$^7$ .......................... C08F 8/30; C08F 283/04; C08J 3/00; C08K 3/20; C08L 75/00
(52) U.S. Cl. .......................... 524/507; 522/90; 522/93; 524/590; 525/123; 525/127; 525/455
(58) Field of Search .......................... 524/507, 590; 525/123, 127, 455; 522/90, 93

(56) References Cited

U.S. PATENT DOCUMENTS

| | | |
|---|---|---|
| 3,485,732 A | 12/1969 | D'Alelio et al. |
| 3,974,303 A | 8/1976 | Iwase et al. |
| 5,620,751 A | 4/1997 | Brindoepke et al. |
| 5,639,560 A | 6/1997 | Moens et al. |

FOREIGN PATENT DOCUMENTS

| | | |
|---|---|---|
| DE | 27 35 497 | 2/1979 |
| DE | 27 12 931 | 12/1987 |
| EP | 0 407 826 | 1/1991 |
| EP | 0 636 669 | 2/1995 |
| EP | 0 702 040 | 3/1996 |
| EP | 0 741 763 | 11/1996 |
| EP | 1 125 996 | 8/2001 |
| EP | 1 323 758 | 7/2003 |
| WO | WO 98/18862 | 5/1998 |
| WO | WO 99/14254 | 3/1999 |

OTHER PUBLICATIONS

Reinhold Plastics Appl., Series, Reinhold Publishing Comp., "Alkyd Resins", pp. 51–59, New York, 1961.
Methoden der Organischen Chemie (Houben–Weyl), E. Mueller, "A$_2$. Methoden zur Herstellung makromolekularer Stoffe durch Polykondensation und Polyaddition sowie durch Polymerisation von cyclischen Monomeren mit Heteroatomen als Ringglieder", vol. 14/2, pp. 1–5, 21–23, 40–44, Georg Thieme Verlag, Stuttgart, 1963.
(English Translation) Methods of Organic Chemistry (Houben–Weyl), Eugen Mueller, "A$_2$. Methods of preparing macromolecular substances by polycondensation and polyaddition and also by addition polymerization of cyclic monomers with heteroatoms as ring members", vol. 14/2, pp. 1–5, 21–23, 40–44, Georg Thieme Verlag, Stuttgart, 1963.

*Primary Examiner*—Patrick D. Niland
(74) *Attorney, Agent, or Firm*—Oblon, Spivak, McClelland, Maier & Neustadt, P.C.

(57) ABSTRACT

A radiation curable powder coating composition that contains a) a binder having at least one amorphous urethane acrylate having a glass transition temperature of at least 35° C. and a melting point of from 50 to 120° C.; and b) an auxiliary, can be crosslinked by radiation to produce a lightfast and weather-stable film.

18 Claims, No Drawings

RADIATION CURABLE POWDER COATING COMPOSITIONS AND THEIR USE

BACKGROUND OF THE INVENTION

1. Field of the Invention

The invention relates to radiation curable powder coating compositions which crosslink to lightfast and weather-stable films.

2. Discussion of the Background

Thermally crosslinkable powder coating materials are known and are widely used in the paint processing industry.

For example, DE-C 27 35 497 describes PU powder coatings having outstanding weathering stability and heat stability. The crosslinkers whose preparation is described in DE-C 27 12 931 are composed of ε-caprolactam-blocked isophorone diisocyanate containing isocyanurate groups. Also known are polyisocyanates containing urethane, biuret or urea groups, their isocyanate groups again being blocked.

The disadvantage of these systems lies in the elimination of blocking agent during the thermal crosslinking reaction. Since, consequently, the blocking agent may be emitted into the environment, it is necessary on ecological grounds and industrial hygiene grounds to take special precautions to clean the outgoing air and/or to recover the blocking agent. Moreover, the reactivity of the crosslinkers is low. Curing temperatures above 170° C. are required.

Both disadvantages—emission of blocking agent and curing at high temperatures—can be removed by using powder coating materials which are cured by radiation instead of thermally. Radiation curable powder coating materials of this kind are known and are described in, for example, U.S. Pat. No. 3,485,732, EP 0407826, EP 0636669, WO 99/14254, U.S. Pat. No. 3,974,303, U.S. Pat. No. 5,639,560 and EP 0934359.

EP 0636669 and WO 99/14254 describe two-component, radiation curable powder coating materials based on an unsaturated polyester and a vinyl ether. The coatings produced from them are unsuitable for outdoor use due to their severe yellowing.

U.S. Pat. No. 3,974,303 describes thermoplastic resins containing from 0.5 to 3.5 polymerizable unsaturated groups per 1000 g molecular weight. The polyurethanes described (see Example 1), however, are not weather-stable and are of poor flexibility due to the absence of polyester groups and the low chain length.

U.S. Pat. No. 5,639,560 describes radiation curable powder compositions comprising special crystalline polyesters, additionally containing methacrylic end groups, as binders. These powder compositions optionally comprise ethylenically unsaturated oligomers, including urethane acrylates, in minor amounts, preferably up to 10 percent by weight. The radiation curable powder coating formulations presented in this patent, however, have significant disadvantages. They can be ground only at −80° C. and, in general, the resultant coatings are either not stable to outdoor weathering or not flexible. A particularly serious disadvantage is that of the very low pendulum hardness (according to König) of below 120 s.

EP 0934359 describes powderous radiation curable mixtures of amorphous and crystalline polyesters containing terminal methacrylate groups. The powder coating materials produced from them do possess a higher glass transition temperature than the crystalline methacrylates of U.S. Pat. No. 5,639,560. However, cooling is still required for their grinding. Moreover, the hardness and adhesion of coatings are no more than acceptable.

SUMMARY OF THE INVENTION

It is an object of the present invention to provide radiation curable powder coating compositions which are stable on storage at 35° C. and which also, after curing of the coating films, lead to coatings having high adhesion. In these coatings hardness should be combined with flexibility, stability and outdoor weathering. Moreover, the powder coating materials ought to be able to be ground with little or no refrigerant.

This and other objects have been achieved by the present invention the first embodiment which includes a radiation curable powder coating composition, comprising:
 a) a binder comprising
  at least one amorphous urethane acrylate having a glass transition temperature of at least 35° C. and a melting point of from 50 to 120° C.; and
 b) an auxiliary.

DETAILED DESCRIPTION OF THE INVENTION

Surprisingly the objects of the present invention have been achieved by using a radiation curable powder coating composition comprising as binder at least one amorphous urethane acrylate having a glass transition point (Tg) of the mixture of at least 35° C., and a melting point of 50–120° C.

The present invention provides radiation curable powder coating compositions, comprising:
 I. a binder comprising at least one amorphous urethane acrylate having a glass transition temperature of at least 35° C. and a melting point of from 50 to 120° C.; and
 II. auxiliaries and additives.

Moreover, the present invention provides a process for producing the above radiation curable powder coating compositions, while observing an upper temperature limit of between 120° C. and 130° C., in heatable kneading devices, particularly extruders.

The invention also provides a process for producing coatings by using the above radiation curable powder coating compositions and provides for the so produced coatings.

Urethane acrylates for the purposes of the present invention comprise a hydroxyl-containing polyester to which urethane groups and acrylate groups are attached by reaction with polyisocyanates and acrylate-containing alcohols. They have a Tg of at least 35° C., preferably at least 25° C. and most preferably at least 15° C.; and a melting point of 50 to 120° C. The melting point includes all values and subvalues therebetween, especially including 60, 70, 80, 90, 100 and 110° C.

The amorphous urethane acrylates of the invention are prepared from amorphous hydroxyl-containing polyesters (I.1) having a Tg of 35–80° C. by reaction with polyisocyanates (I.2) and a compound containing both at least one alcohol group and at least one polymerizable acrylate group (I.3). They contain both urethane groups and terminal acrylate groups. The Tg of the amorphous hydroxyl-containing polyester I.1 includes all values and subvalues therebetween, especially including 40, 45, 50, 55, 60, 65, 70 and 75° C.

The amorphous hydroxyl-containing polyesters I.1 having a Tg of 35–80° C. are prepared by polycondensation of appropriate dicarboxylic acids and diols. Condensation takes place conventionally in an inert gas atmosphere at temperatures from 100 to 260° C., preferably from 130 to 220° C., in the melt or in an azeotropic procedure, as described, for example, in Methoden der Organischen Chemie (Houben-Weyl), Volume 14/2, pages 1 to 5, 21 to 23, 40 to 44, Georg Thieme Verlag, Stuttgart, 1963, or in C. R. Martens, Alkyd Resins, pages 51 to 59, Reinhold Plastics Appl. Series, Reinhold Publishing Comp., New York, 1961. The temperature of the condensation includes all values and subvalues therebetween, especially including 110, 120, 130, 140, 150, 160, 170, 180, 190, 200, 210, 220, 230, 240 and 250° C. The carboxylic acids preferred for preparing polyesters may be aliphatic, cycloaliphatic, aromatic and/or heterocyclic in nature and may, if desired, be substituted by halogen atoms and/or unsaturated. Preferred examples thereof include the following: succinic, adipic, suberic, azelaic, sebacic, phthalic, terephthalic, isophthalic, trimellitic, pyromellitic, tetrahydrophthalic, hexahydrophthalic, hexahydroterephthalic, dichlorophthalic, tetrachlorophthalic, endomethylenetetrahydrophthalic, and glutaric acid, 1,4-cyclohexanedicarboxylic acid, and—where available—their anhydrides or esters. Particularly preferably are isophthalic acid, terephthalic acid, hexahydroterephthalic acid, and 1,4-cyclohexanedicarboxylic acid.

Preferred examples of polyols include monoethylene glycol, 1,2- and 1,3-propylene glycol, 1,4- and 2,3-butylene glycol, di-(β-hydroxyethylbutanediol, 1,5-pentanediol, 1,6-hexanediol, 1,8-octanediol, decanediol, dodecanediol, neopentyl glycol, cyclohexanediol, 3(4),8(9)bis(hydroxymethyl)tricyclo[5.2.1.0$^{2,6}$]decane(dicidol), 1,4-bis(hydroxymethyl)cyclohexane, 2,2-bis(4-hydroxycyclohexyl)propane, 2,2-bis[4-(β-hydroxyethoxy)phenyl]propane, 2-methylpropane-1,3-diol, 2-methylpentane-1,5-diol, 2,2,4(2,4,4)-trimethylhexane-1,6-diol, glycerol, trimethylolpropane, trimethylolethane, hexane-1,2,6-triol, butane-1,2,4-triol, tris(β-hydroxyethyl) isocyanurate, pentaerythritol, mannitol, and sorbitol, and also diethylene glycol, triethylene glycol, tetraethylene glycol, dipropylene glycol, polypropylene glycols, polybutylene glycols, xylylene glycol, and neopentyl glycol hydroxypivalate. Particular preference is given to monoethylene glycol, neopentyl glycol, dicidol, cyclohexanedimethanol, trimethylolpropane, and glycerol.

Subsequent or additional branching of the polyesters with polyisocyanates is possible. In such cases it is preferable to use, for example, the isophoronediisocyanato isocyanurate.

Amorphous polyesters thus prepared have an OH number of 15–150 mg KOH/g, a Tg of 35–80° C., and an acid number of <5 mg KOH/g. It is also possible to use mixtures of amorphous polyesters. The OH number of the amorphous polyester includes all values and subvalues therebetween, especially including 20, 30, 40, 50, 60, 70, 80, 90, 100, 110, 120, 130 and 140 mg KOH/g. The Tg of the amorphous polyester includes all values and subvalues therebetween, especially including 40, 45, 50, 55, 60, 65, 70 and 75° C.

Preferred polyisocyanates I.2 in the amorphous urethane acrylates are diisocyanates of aliphatic, (cyclo)aliphatic or cycloaliphatic structure. Particularly preferred examples of the polyisocyanates are 2-methylpentamethylene 1,5-diisocyanate, hexamethylene diisocyanate, trimethylhexamethylene 1,6-diisocyanate, especially the 2,2,4- and 2,4,4-isomer and technical-grade mixtures of both isomers, 4,4'-methylenebis(cyclohexyl isocyanate), norbornane diisocyanate, and 3,3,5-trimethyl-1-isocyanato-3-isocyanatomethylcyclohexane (IPDI). Likewise highly suitable in addition are polyisocyanates obtainable by reacting polyisocyanates with themselves by way of isocyanate groups, such as isocyanurates, formed by reaction of three isocyanate groups. The polyisocyanates may likewise contain biuret or allophanate groups. IPDI is especially preferred.

Preferred polymerizable compounds I.3 containing at least one free OH group and one polymerizable acrylate group include, for example, hydroxyethyl acrylate (HEA), hydroxypropyl acrylate, and glycerol diacrylate. Hydroxyethyl acrylate (HEA) is especially preferred.

For preparing the amorphous urethane acrylate from the amorphous OH-containing polyesters I.1, polyisocyanates I.2, and compounds I.3, the polyisocyanate is introduced as an initial charge, DBTL as catalyst and IONOL CP (Shell) as polymerization inhibitor are added, and the polyester is added in an NCO:OH ratio of 2.5–1.5:1. The NCO:OH ratio includes all values and subvalues therebetween, especially including 2.4:1, 2.3:1, 2.2:1, 2.0:1, 1.9:1, 1.8:1, 1.7:1 and 1.6:1. After the end of the addition, the reaction is completed at 100–140° C. The temperature includes all values and subvalues therebetween, especially including 110, 120 and 130° C. Thereafter, component 1.3, e.g., hydroxyethyl acrylate, in a residual-NCO:OH ratio of 1.0–1.1:1 is added to the reaction product and the reaction is completed at 80–140° C. so as to give an NCO content of less than 0.1%. The residual NCO:OH ratio includes all values and subvalues therebetween, especially including 1.01:1, 1.02:1, 1.03:1, 1.04:1, 1.05:1, 1.06:1, 1.07:1, 1.08:1, 1.09:1. The temperature for completing the reaction includes all values and subvalues therebetween, especially including 90, 100, 110, 120 and 130° C. Also possible is a prior reaction of a polyisocyanate, e.g. IPDI, with component I.3 and the addition of this NCO-containing precursor to the hydroxyl-containing polyester.

For the radiation curing of the powder coating composition of the invention, accelerated electron beams are preferred. The electron beams generate free radicals from the powder coating composition, in a number which ensures extremely rapid polymerization of the reactive acrylate groups. It is preferred to use radiation doses of from 5 to 15 Mrad. The radiation dose includes all values and subvalues therebetween, especially including 6, 7, 8, 9, 10, 11, 12, 13 and 14 Mrad.

In the case of UV curing, further necessary starting materials used include UV initiators, which are known in principle from conventional liquid UV-curing systems, e.g., EP 633912. These are substances which on irradiation with UV light break down into free radicals and so initiate the polymerization. Examples of preferred UV initiators include 2,2'-diethoxyacetophenone, hydroxycyclohexyl phenyl ketone, benzophenone, 2-hydroxy-2-methyl-1-phenylpropan-1-one, xanthone, thioxanthone, benzil dimethyl ketal, etc. UV initiators of this kind are available commercially, e.g., IRGACURE 184 or DEGACURE 1173 from Ciba. The fraction of the photoinitiator in the overall composition is approximately 0.5 to 5% by weight. The fraction of the photoinitiator includes all values and subvalues therebetween, especially including 1, 1.5, 2, 2.5, 3, 3.5, 4 and 4.5% by weight.

The use of initiators, e.g., thioxanthones, phosphine oxides, metallocenes, tertiary aminobenzenes or tertiary aminobenzophenones, which break down into free radicals on exposure to visible light is more preferred.

Optional additives are acrylate or methacrylate compounds, such as the triacrylate of tris(2-hydroxyethyl) isocyanurate (SR 386, Sartomer), and adhesion promoters, which may be used in minor fractions of 0–20% by weight in order to modify the coating properties. The amount of the optional additive includes all values and subvalues therebetween, especially including 5, 10 and 15% by weight.

Further additives customary in the case of powder coating materials are leveling agents, light stabilizers, and devolatilizers. These may be used at 0–5% by weight. The amount of further additives includes all values and subvalues therebetween, especially including 1, 2, 3 and 4% by weight. Also possible is the use of pigments and extenders, e.g., metal oxides such as titanium dioxide and metal hydroxides, sulfates, sulfides, carbonates, silicates, talc, carbon black, etc., in weight fractions of 0–40%. The amount of pigments or extenders includes all values and subvalues therebetween, especially including 5, 10, 15, 20, 25, 30 and 35% by weight.

In order to prepare the ready-to-use powder coating composition the ingredients are mixed. Homogenization of the ingredients may take place in suitable apparatus, such as heatable kneading devices, for example, but preferably by extrusion, with recommended upper temperature limits of 120–130° C. The upper temperature limit includes all values and subvalues therebetween, especially including 122, 124, 126 and 128° C. Following cooling to room temperature and appropriate size reduction, the extrudate is ground to the ready-to-spray powder without addition of refrigerants. Application of the ready-to-spray powder to appropriate substrates may take place in accordance with the known methods, such as by electrostatic or tribostatic powder spraying, fluidized bed sintering or electrostatic fluid-bed sintering, for example. Preferred examples of substrates include untreated and pretreated metallic substrates, wood, wood materials, plastics, glass, and paper.

The coatings produced from the powder coating compositions of the invention are stable to light and weathering, flexible and hard, and possess good adhesion. The invention accordingly further provides for the use of the radiation curable compositions for producing coatings and also to a process for producing coatings by using the powder coating compositions.

In the present invention, "parts" refers to "parts by weight."

Having generally described this invention, a further understanding can be obtained by reference to certain specific examples which are provided herein for purposes of illustration only, and are not intended to be limiting unless otherwise specified.

EXAMPLES

Example 1

Preparation Procedure for the Amorphous Hydroxyl-containing Polyester

Acid components and alcohol components are admixed with 0.2 percent by mass of n-butyltin trioctanoate and heated at 190° C. under nitrogen and with stirring in an apparatus provided with a distillation column. As water is separated out, this temperature is slowly raised to 230° C. After about 98% of the theoretical amount of water has been removed by distillation, the product is cooled and tested for OH number (OHN in mg KOH/g) and acid number (AN in mg KOH/g).

In this way, the following polyester was prepared:

A1: amorphous polyester composed of IPA 100%, MEG 20%, CHDM 40% and NPG 40%, OHN 41 mg KOH/g, AN 0.5 mg KOH/g, Tg 53° C.;

IPA: isophthalic acid, MEG: monoethylene glycol, CHDM: 1,4-cyclohexanedimethanol, NPG: neopentyl glycol.

Example 2

Preparation of the Amorphous Urethane Acrylate A1U 260.0 g of the polyester A1 (OHN 41) were melted and added in portions at 120° C. with vigorous stirring to a mixture of 83.3 g of a 1:1 adduct of IPDI and hydroxyethyl acrylate, 0.7 g of IONOL CP and 0.2 g of DBTL. After about one hour of stirring, the NCO content was below 0.1% and the hot reaction mixture was poured from the flask onto a sheet. As soon as the reaction mass had solidified and cooled, it was mechanically size-reduced and ground. The Tg of this product was 45° C.

Example 3

Preparation of Polymers and Powder Coating Compositions of Examples 1 and 2 and of the Comparative Experiment Z 100 parts of the amorphous urethane acrylate A1 U were admixed with 0.7 part of BYK 361 (leveling agent, BYK Chemie), 1.0 part of Worlée Add 900 (devolatilizer, Worlée-Chemie) and 1 part of EBECRYL 170 (adhesion promoter, UCB). The size-reduced ingredients were intimately mixed in an edge runner mill and then homogenized in an extruder at not more than 130° C. After cooling, the extrudate was fractionated and ground to a particle size <100 μm using a pinned-disk mill, with (in the case of the Comparative Experiment) and without (in the case of the Example according to the present invention) the addition of refrigerants (liquid nitrogen or dry ice). The powder thus prepared was applied using an electrostatic powder spraying unit at 60 kV to degreased and optionally pretreated aluminum panels and MDF boards (medium density fiberboards). It was then melted under IR irradiation and cured by means of electron beams (15 Mrad).

Comparative Example Z

For Comparative Example Z the following formulation was used:

300 g UVECOAT 2100 (UCB Chemicals)
86 g UVECOAT 9010 (UCB Chemicals)
8 g IRGACURE 184 (Ciba Specialty Chemicals)
4 g RESIFLOW PV 5 (Worlée-Chemie)
2 g WORLÉE Add 900 (Worlée-Chemie)

The parameters are summarized in Table 1:

TABLE 1

| Experiment | amorphous urethane acrylate in parts by weight | Substrate | Grindable without refrig.[1] | $HK^2$ [see] | $EC^3$ [mm] | $CC^4$ |
|---|---|---|---|---|---|---|
| 1 | 100 | Aluminum | Yes | 228 | 6.5 | 0 |
| 2 | 100 | MDF | Yes | 204 | — | 0 |
| Comparative Z | | Standard steel | No | 88 | 6.5 | 0 |

[1] Grindability without use of refrigerant
[2] Hardness according to König (DIN 53 157)
[3] Erichsen cupping (DIN 53 156)
[4] Cross-cut (DIN 53153, ISO 2409)

(Scale 0 (no loss of adhesion) to 5 (total loss of adhesion))

Only Experiments 1 and 2 were grindable without addition of refrigerant and, moreover, exhibit a combination of high hardness, flexibility, and excellent adhesion in the coating. The Comparative Example Z had weaknesses, in particular, in the grindability of the powder and in the hardness of the coating.

German patent application 10163826.4 filed Dec. 22, 2001, is incorporated herein by reference.

Numerous modifications and variations on the present invention are possible in light of the above teachings. It is therefore to be understood that within the scope of the appended claims, the invention may be practiced otherwise than as specifically described herein.

What is claimed is:

1. A radiation curable powder coating composition comprising:
   a) a binder comprising
      at least one amorphous urethane acrylate having a glass transition temperature of at least 35° C. and a melting point of from 50 to 120° C.; and
   b) an auxiliary, wherein the amorphous urethane acrylate is obtained by reacting the following components:
      a1) at least one amorphous hydroxyl-containing polyester having a glass transition temperature of 35–80° C.;
      a2) at least one polyisocyanate; and
      a3) at least one compound containing at least one alcohol group and at least one polymerizable acrylate group.

2. The radiation curable powder coating composition as claimed in claim 1, wherein the polyester a1 comprises d) at least one monomeric dicarboxylic acid selected from the group consisting of isophthalic acid, terephthalic acid, hexahydroterephthalic acid, and 1,4-cyclohexanedicarboxylic acid and e) at least one monomeric polyol selected from the group consisting of monoethylene glycol, butanediol, hexanediol, neopentyl glycol, dicidol, cyclohexanedimethanol, trimethylolpropane, and glycerol.

3. The radiation curable powder coating composition as claimed in claim 1, wherein said polyisocyanate a2 is selected from the group consisting of isophorone diisocyanate, hexamethylene diisocyanate, trimethylhexamethylene diisocyanate, dicyclohexylmethyl diisocyanate, 2,2,6-trimethyl-1,4-diisocyanatocyclohexane, norbornane diisocyanate and mixtures thereof.

4. The radiation curable powder coating composition as claimed in claim 1, wherein said polyisocyanate a2 is an isocyanurate, an allophanate or a biuret.

5. The radiation curable powder coating composition as claimed in claim 1, wherein said compound containing at least one alcohol group and at least one polymerizable acrylate group is hydroxyethyl acrylate.

6. The radiation curable powder coating composition as claimed in claim 1, wherein said auxilliary is selected from the group consisting of an UV initiator, a leveling agent, a light stabilizer, a devolatilizer, a pigment, a filler, an adhesion promoter, and mixtures thereof.

7. The radiation curable powder coating composition as claimed in claim 1, further comprising:
an acrylate-containing compound, a methacrylate-containing compound or both.

8. A coating obtained by curing the radiation curable powder coating composition as claimed in claim 1.

9. A process for producing a radiation curable powder coating composition according to claim 1, comprising:
admixing said binder and said auxiliary at a temperature of not more than 120° C. to 130° C. in a heatable kneading device.

10. The process according to claim 9, comprising admixing said binder and said auxilliary in an extruder.

11. The process according to claim 9, wherein the polyester a1 comprises d) at least one monomeric dicarboxylic acid selected from the group consisting of isophthalic acid, terephthalic acid, hexahydroterephthalic acid, and 1,4-cyclohexanedicarboxylic acid and e) at least one monomeric polyol selected from the group consisting of monoethylene glycol, butanediol, hexanediol, neopentyl glycol, dicidol, cyclohexanedimethanol, trimethylolpropane, and glycerol.

12. The process according to claim 9, wherein said polyisocyanate a2 is selected from the group consisting of isophorone diisocyanate, hexamethylene diisocyanate, trimethylhexamethylene diisocyanate, dicyclohexylmethyl diisocyanate, 2,2,6-trimethyl-1,4-diisocyanatocyclohexane, norbornane diisocyanate and mixtures thereof.

13. The process according to claim 9, wherein said polyisocyanate a2 is an isocyanurate, an allophanate or a biuret.

14. The process according to claim 9, wherein said compound containing at least one alcohol group and at least one polymerizable acrylate group is hydroxyethyl acrylate.

15. The process according to claim 9, wherein said auxilliary is selected from the group consisting of an UV initiator, a leveling agent, a light stabilizer, a devolatilizer, a pigment, a filler, an adhesion promoter, and mixtures thereof.

16. The process according to claim 9, further comprising:
an acrylate-containing compound, a methacrylate-containing compound or both.

17. A process for producing a coating, comprising:
coating a substrate with the radiation curable composition according to claim 1 to obtain a coated substrate; and
irradiating said coated substrate.

18. The process according to claim 17, wherein said irradiating proceeds using an electron beam or UV radiation.

* * * * *